Patented Sept. 9, 1947

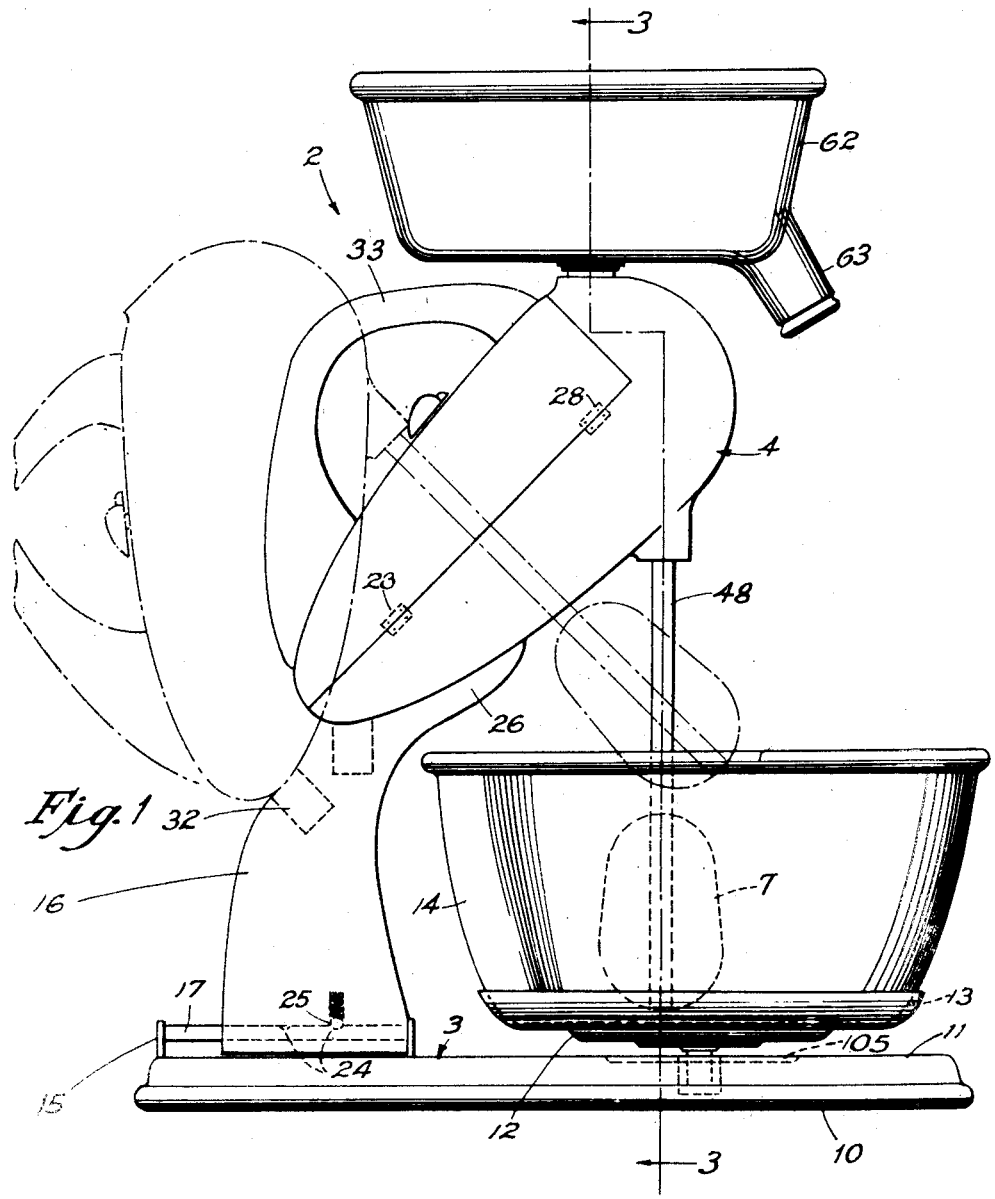

2,427,099

UNITED STATES PATENT OFFICE 2,427,099

FOOD MIXER

Verne C. Kennedy, Evanston, Ill., assignor to A. F. Dormeyer Mfg. Company, a corporation of Illinois Application April 10, 1943, Serial No. 482,550

15 Claims. (Cl. 259—85)

This invention relates to food mixers, and the like.

One of the objects of the invention is the provision of a new and improved apparatus for mixing foods, confections, and the like, that is adapted to utilize bowls, containers, and mixing cups of various sizes and heights in the mixing operation that occupy a minimum amount of space.

Another object of the invention is the provision of a new and improved mixer that is easily and readily adjusted to accommodate bowls and other containers of various diameters.

A further object of the invention is the provision of a new and improved mixer device that has sufficient clearance and is adapted to be employed for mixing liquids and frozen confections in the conventional mixing cups used at soda fountains and other confection counters in drug stores and the like.

Another object of the invention is to provide a new and improved transmission and gear arrangement which enables a device of the class described to serve as a combined food and confection mixer with conventional mixing bowls and cups.

Another object of the invention is the provision of a transmission for food mixers with which the motor shaft is neither horizontal nor vertical, but has the advantages of a 45° angle and a thrust bearing to clear a high mixing cup and stabilize the setting of the speed governor.

A further object of the invention is the provision of a new and improved governor means for controlling the operation of the motor and operated mechanism.

A still further object of the invention is the provision of a new and improved food mixer that is simple in construction, easily assembled, comparatively inexpensive, efficient in operation, and that may be easily and readily adjusted to operate with bowls or containers of various diameters.

Other and further objects and advantages of the invention will appear from the drawings, the description relating thereto, and the appended claims.

In the drawings,

Fig. 1 is a side elevation of a food mixer, shown more or less diagrammatically, with the operating mechanism in operative position in full lines, and in inoperative position in dotted lines, with parts omitted for the sake of clearness in illustration;

Fig. 2 is a vertical section of a portion of the base through the slide mechanism;

Figure 3:
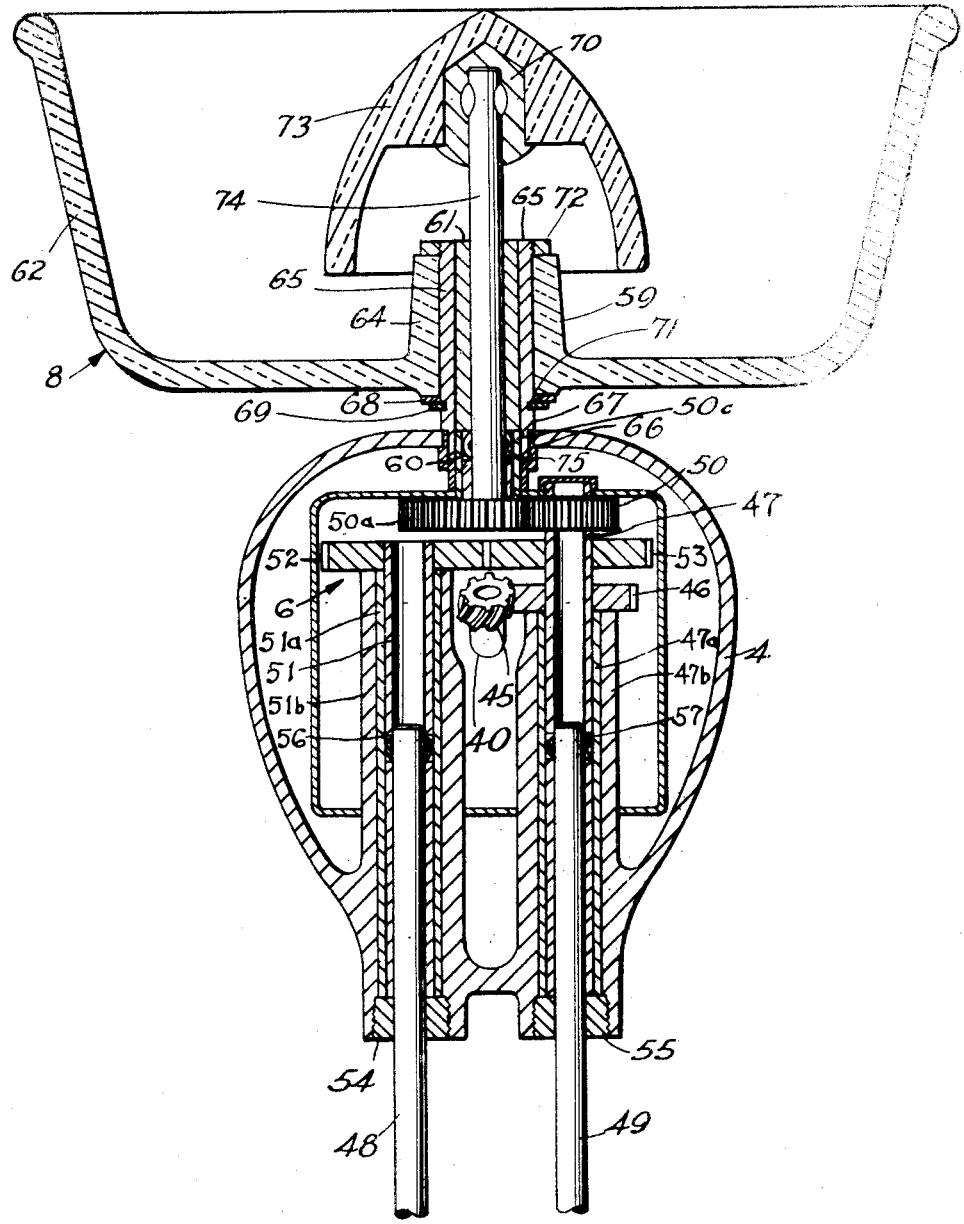
Fig. 3 is a vertical section on the line 3—3 of Fig. 1, showing the juicer bowl in position thereon, with parts broken away.

In food mixers especially for domestic use it has been found desirable to provide a food mixer which will serve a dual purpose, namely, one so constructed and arranged that confections and drinks, as well as food products, can be thoroughly mixed in a minimum of time and with a maximum of efficiency. Furthermore, in the modern kitchen, especially in apartments, it is a necessary requirement that the apparatus be not only efficient, but that it occupy a minimum of space.

The present invention satisfies these requirements by the provision of a transmission and an apparatus which provides ample space beneath the supporting arm to provide sufficient clearance for the conventional tall confection mixing cups, as well as the bowls or containers of large diameters, without increasing the size and weight of the apparatus.

Referring now to the drawings, the reference character 2 designates the mixer as a whole, which comprises a support 3 on which is detachably mounted a shell or casing 4 within which is mounted a motor or power unit 5, and transmission mechanism 6, for operating the beater device 7 or the reamer or juicer mechanism 8. Speed control or centrifugal governor mechanism 9 is provided for controlling the motor speed.

The construction of the casing 4, the construction of the motor 5 itself, and the manner in which the motor 5 is mounted in the casing 4 are shown only diagrammatically in the present application, same being shown and described in detail in my co-pending application, Serial No. 444,314, which has issued as Patent No. 2,406,150, reference to which is hereby made to the extent that a full understanding of the construction and arrangement of these parts may be desired.

The support 3 comprises the base 10 and a pedestal or standard 16. The base 10 of the apparatus is provided with a flat surface 11, on which is rotatably mounted a turn table 12, having a recess 13 therein for receiving a bowl or container 14, as clearly shown in Fig. 1 of the drawing. The upper face 11 of the base 10 is provided at one extremity opposite the turn table 12 with means 15 for slidably attaching the upwardly extending pedestal or standard 16 thereto.

It is preferred that the connection between the standard and the base be an adjustable one. In the form of construction selected to illustrate this embodiment of the invention, a dovetail-like slidable connection is employed for this purpose. As shown, the base is provided with an upwardly extending tongue 17, having laterally extending projections or flanges 18, 19, integral with its upper face to provide a track. The standard 16 is provided with a groove 21 which is laterally extended, as at 22, 23, at each side thereof for receiving the lateral projections or flanges 18, 19, on the tongue 17, as shown more clearly in Fig. 2 of the drawing.

The tongue 17 is provided with a plurality of recesses 24 on its upper surface, which are adapted to be engaged by a spring-pressed detent 25 carried by the standard 16. Any suitable number of recesses 24 may be provided, as desired. In the form of construction shown, two recesses are provided for positioning the standard at two different positions on the base.

In the position shown in Fig. 1, which is the innermost position, the beaters are at their limit nearest to the center of the turntable, but with one slightly eccentric to the axis of rotation of the turntable 12, and when the standard is in the outer position at least one of the beaters will be adjacent the wall of the bowl 14, depending upon the relationship between the size of the bowl and the curve of the track. The beater which is slightly eccentric to the center of the turntable is the one which can be replaced by a confection beater to be located near the side of the confection mixing cup to obtain proper circulation of the contents. The upper end of the standard 16 is provided with an extension 26 that extends inwardly and upwardly to form a saddle or rest for receiving the lower end of the shell or gear casing 4, as will presently appear.

As shown in said Patent No. 2,406,150, the shell 4 may be in two sections secured together in any suitable manner, as by clips 28, or the like. This housing or shell 4 is more or less ovate, and its lower or smaller end is provided with a downwardly extending polygonal shank 29 which is adapted to engage snugly a correspondingly shaped opening or socket 31 in the standard 16 for holding the shell in the operative position on the standard, as shown in full lines in Figs. 1 and 4.

The standard 16 is also provided with an additional opening or socket 32, arranged to the rear and at an angle to the opening 31 for receiving the shank 29 for holding the shell and operating mechanism in inoperative position, as shown in dotted lines in Fig. 1. The shank and socket have an interlocking connection for preventing lateral rotation. As shown, the shank is polygonal in cross-section, and the socket is of corresponding form for receiving the shank. The shank is of sufficient length, and the opening of such depth, that the parts will be held firmly in adjusted position by gravity. When in the position shown in full lines in Fig. 1, the shell or casing 4 will rest on the saddle 26, which will assist the shank in holding the parts firmly in the position illustrated.

The shell carries a handle 33 by means of which the shell and operating mechanism may be moved from operative to inoperative position, or be removed entirely from the standard when it is desired to use the beaters in other relations.

The shell or casing 4 contains a motor or power unit 5, transmission mechanism 6, a fan 36, and the automatic speed control mechanism 9. Air intake openings and air discharge openings are provided for the fan in the shell, as shown at 27 and 34, respectively. For the sake of clearness, as already mentioned, certain parts of the operating mechanism, including portions of the wiring for the electric circuit, are omitted from the drawing. This construction is disclosed in said Patent No. 2,406,150.

The power unit 5 comprises a stator 38 and a rotor or armature 39. The motor is provided with the usual commutator 41, brushes 37, diagrammatically shown in Fig. 4, and the switch 35 on the shell beneath the handle. The major portion of the circuit is omitted for the sake of clearness. The upper end of the motor shaft 40 is provided with a bearing 42, which is supported from the casing or shell in any suitable manner, as by means of the supporting arms 43 attached to the bearing and rigidly connected to the shell, as by screws as shown more specifically in the Patent No. 2,406,150. The lower end of the motor shaft is journaled in an anti-friction bearing 44, supported by a bracket 30 secured to the shell. The anti-friction member 44 also constitutes a downward thrust bearing for the shaft 40. The motor shaft 40 extends inwardly and upwardly over the turntable, and is provided at its upper end with a spiral gear 45 which is adapted to engage a corresponding spiral gear 46 fixed to a hollow or beater shaft 47 (see Fig. 3) of the transmission mechanism 6. The beater shaft 47 is journalled in a self-oiling bearing 47a secured in a support 47b by a press fit. The support 47b may be integral with one section of the shell or casing 4.

The beater device is provided with two interdigitating beaters 48 and 49. These beaters are adapted to be rotated in opposite directions, and this is accomplished by the beater shaft 47 and by an additional sleeve or beater shaft 51 which is parallel to the shaft 47 and extends substantially vertically downwardly from the upper portion of the casing or shell 27. Suitable means are provided for rotatably mounting these hollow beater shafts in position in the casing. The beater shaft 51 is journaled in a self-oiled bearing 51a secured in a support 51b by a press fit. The support 51b is preferably, though not necessarily, integral with a section of the shell 4. The beater shafts 47 and 51 are positioned the conventional distance apart, and in order to conserve space the parts are so arranged, and the gears so proportioned, that the spiral gear 46 is located between the beater shafts, as shown more clearly in Fig. 3. The beater shafts 47 and 51 are provided with intermeshing gears 52, 53, which are fixed to said shafts.

Moreover, it will be seen that the beaters 48 and 49 are supported over a substantial portion of their upper end with plenty of space in the shafts 47 and 51 to receive further support by making the beaters longer, if desired. This length of support is possible due to locating the shafts 47 and 51 diagonally within the contour of the power unit where they can be received in the shell without detracting from the appearance of the food mixer. This construction contributes greatly to the rigidity of the long beaters.

It will also be seen that when the motor shaft 40 rotates it will cause the gears 52, 53, and with them the shafts 47, 51, to rotate in opposite directions. The shafts 47 and 51 are supported by threaded plugs 54 and 55, having axial openings therethrough through which the shanks of the beaters 48, 49, may extend with grease seals provided, if desired.

The upper ends of the beater members 48 and 49 are provided with resilient holding members or resilient keys 56, 57, which are adapted to engage recesses in the corresponding beater shafts 51 and 47 for holding the shanks 48, 49, in position therein, and for causing said shanks to rotate in opposite directions with the beater shafts 51 and 47.

Suitable means operated by the motor are provided for reaming or juicing citrous fruits and the like. It is desirable that this means be operated at a materially reduced speed over that of the beater shafts. In the form of construction shown, the drive shaft 47 is extended upwardly above the gear 53, and has fixed thereon a pinion 58 which meshes with a gear 58ᵃ on a reamer or stub shaft 58ᵇ, which in turn has its upper end provided with open-ended slots 60 adapted to be engaged by suitable projections on the reamer shaft for rotating the latter, as will presently appear. The lower end of the reamer shaft extends below the gear 58ᵃ. It is journalled in a suitable bearing 58ᶜ, supported by an arm 58ᵈ carried by the bracket 43.

The reamer mechanism 8 is adapted to be detachably connected to the upper surface of the casing 4 in a manner now to be described. This mechanism comprises a dish or receptacle which may be of porcelain, glass, or some plastic material, and comprises a bowl 62 having a downwardly and outwardly extending spout 63 through which the extracted juice is adapted to flow. A deflector may be secured to the spout 63, if desired. It will be noted that the reamer mechanism is so located on the shell 4 that the spout 63 may discharge into a receptacle on the turntable 12, as is clear from an inspection of Fig. 1. The bowl 62 is provided with an upwardly extending hub portion 64, having an axial opening through which extends an attaching sleeve 65. The sleeve 65 is reduced at its lower end, as at 66, forming a shoulder 67.

The upper end of the casing 4 is provided with an aperture or opening which is adapted to receive the lower reduced end 66 of the sleeve 65. The reduced portion 66 forms a snug sliding fit and constitutes the means for removably holding the reamer mechanism in position on the casing. The bowl 62 seats against a washer 68, which in turn seats on a split spring washer 69 that is seated in a groove 71 formed in the exterior of the sleeve 65. The upper end of the sleeve 65 is threaded, and a nut 72 is adapted to engage the upper threaded end of the sleeve 65 and abut against the hub 59 for clamping and holding the parts in assembled relation. A self-oiling bearing 61 is secured in the sleeve 65 by a press fit.

The reamer member 73 is of the usual shape and extends upwardly within the bowl 62. This reamer may be of any suitable material, such as glass, porcelain, plastic or ceramic material. It is provided with a downwardly extending shank or stem 74, which has radially extending projections or portions 75 adapted to seat in the open ended slots or notches 60 formed in the upper end of the stub shaft 58ᵇ for causing the rotation of the reamer. The upper end of the shank 74 is secured in a recess in the reamer member 73 by casting soft metal 70 therein, around the end portion of this shank.

Since the device is adapted to be used for reaming or the extraction of juices and the like, and is also adapted to be used in the mixing of foods, liquids, etc., is is evident that the load on the motor will vary, and in order to prevent excessive speed on the motor a suitable governor mechanism 9 is provided.

Figures 4, 5, 6:
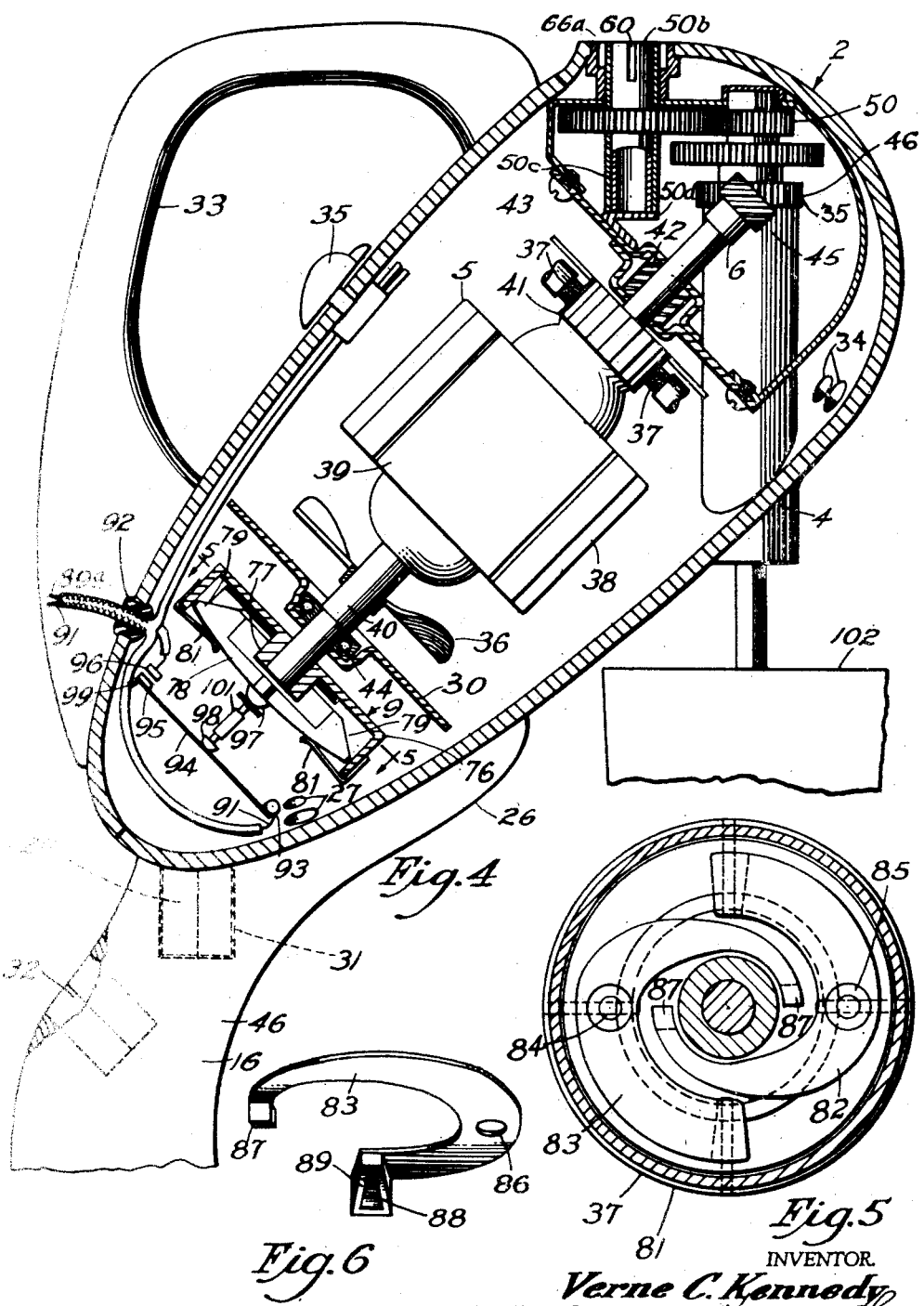
Fig. 4 is a longitudinal vertical section of the device with parts broken away.
Fig. 5 is a section on the line 5—5 of Fig. 4.
Fig. 6 is a perspective view of one of the speed control governor members.

This governor mechanism comprises an outer casing member 76, which is in the form of an inverted cup-shaped member having a central hub portion 77 extending downwardly axially of the casing. The hub 77 is provided with an axial opening into which the lower reduced end of the shaft 40 is fixed. Loosely mounted within the casing 76 is a circular cam member 78, having an inclined cam face 79 facing upwardly on its outer edge. The cam member 78 is held within the casing 76 by spring fingers 81 rigidly attached to the side wall of the casing 76 and extending beneath said member. A plurality of centrifugally operated arm members 82, 83, are pivotally connected to the casing 76 within the same, as shown in Fig. 5. These arms or members are preferably curved in order to be located within the casing member 76, and are provided with openings 86 for receiving the pivot pins 84, 85, carried by said casing member. Since the members 82, 83, are substantially alike, only one need be described.

The inner end of each of the members 82, 83, is provided with a weight 87, and on its other end with a light cam or wedge member 88 having its lower face inclined, as at 89, for engaging the corresponding incline 79 on the cam member 78, Fig. 4. The centrifugal pivot members 82, 83, are angularly spaced 180° apart, and when assembled they will partially nest, as shown in Fig. 5, thereby occupying a minimum amount of space. It is evident from an inspection of Figs. 4 and 5 that centrifugal force will tend to cause the weights 87 to move outwardly, thereby forcing the cam faces 89 of the shoes 88 into contact with the inclined face of the switch operating member 78 and camming the same outwardly against the tension of the springs 81.

Means are provided for utilizing this movement for opening the circuit through the motor. As shown, the leads 89ᵃ, for the motor enter through an eyelet 92 fixed in an opening in the shell or casing 4. The lead 89ᵃ is attached to a terminal 93, to which is connected a spring contact arm 94 which in turn carries one terminal 95 of a switch 99 adapted to engage the other or fixed terminal 96 of this switch for closing the circuit. The terminal 96 is electrically connected to a terminal of the switch 35 on the shell, as is usual in such constructions. From the switch 35 a conductor is attached to one of the brushes, and the other lead 91 is connected to the other brush, as is usual in such constructions.

Suitable means are provided for opening the switch 99 when the speed of the governor exceeds a predetermined amount. This is accomplished by providing the cam member 78 with a button or projection 97, which is adapted to engage an arm or push rod 98 interposed between the button 97 and the switch arm 94. The push rod 98 may be slidably mounted in a bracket 101 carried by the shell. It will be seen from an inspection of Figs. 4 and 5 that when the speed of the motor increases the cam members 88 on the centrifugal arms is caused to move inwardly by the centrifugal weight, thus riding up the incline and forcing the centrifugal member 78 downwardly, and with it the switch arm 94 for opening the circuit at the switch 99. In other words, the speed of the motor is controlled by the make and break circuit at the switch 99, which in turn is controlled by the centrifugal governor mechanism.

It will thus be seen that by sliding the standard 16 inwardly, bowls of smaller diameter could be substituted for the bowl 14 without destroying the relative position of the bowl and beaters. Furthermore, with an arrangement in which the shell or casing 4 extends upwardly and inwardly, sufficient clearance is provided for accommodating the conventional mixing cups 102 without increasing the height of the standard, as is usual in such constructions. The base 10 may be, and preferably is, provided with a depression 105 in the surface 11, for receiving the cup 102. When the latter is employed as the mixing receptacle the turntable 13 is, of course, removed. If desired, a smaller turntable may be substituted for the turntable 12 by first removing the latter.

Furthermore, by arranging the shell or motor housing at an inclination to the base, the handle 33 may be fixed on the housing in such position that it will not interfere with the operation of the reamer mechanism, as clearly shown in Fig. 1 of the drawing. The upper surface of the handle may be substantially horizontal, thus providing ample clearance for the juicer attachment. These are considered important features of the invention.

The juicer or reamer mechanism 8 may be removed by elevating the same to disengage the sleeve 65 from the opening 66 in the upper end of the shell. The reamer shaft 74 will move upwardly with the reamer and juicer mechanism and disengage the projections 75 from the slots 60, thus leaving the shell in the condition shown in Fig. 4.

It is thought from the foregoing, taken in connection with the accompanying drawings, that the construction and operation of my device will be apparent to those skilled in the art, and that changes in size, shape, proportion or detail may be made without departing from the spirit and scope of the appended claims.

I claim as my invention:

1. In a food mixer, an ovate motor housing, a motor within said housing having its armature shaft extending axially of said housing, a base, a supporting standard extending upwardly from said base, and means for attaching one end of said housing to said base for holding the axis of said housing at an acute angle to said base in operative position or at substantially right angles thereto in an inoperative position.

2. In a food mixer, a base, a pedestal extending upwardly from said base, an ovate motor housing, means for detachably connecting one end of said housing to the upper end of said standard, the longitudinal axis of said housing extending upwardly and inwardly from said pedestal, a motor within said casing, an armature shaft for said motor extending longitudinally along said housing, a pair of beater shafts extending downwardly from the upper end of said armature shaft, spiral gear members for driving one of said beater shafts from said armature shaft, and gear members for driving the other beater shaft from said one beater shaft.

3. In a food and drink mixer, a base having a removable turntable thereon, a bowl on said turntable, said base having a recess therein beneath said turntable and concentric therewith, a pedestal extending upwardly from said base, a shell extending diagonally upwardly from said pedestal, a motor having its armature shaft extending longitudinally of said shell and within the same, a plurality of downwardly extending beater shafts, gears on said shafts in mesh, a spiral gear on one of said shafts, a spiral pinion on said armature shaft for driving said spiral gear for operating said beater shafts in opposite directions, a handle on the upper portion of said shell, a power shaft extending to the exterior of said shell between said beater shaft and said handle, a gear on said power shaft, a pinion on one of said beater shafts for driving said last-named gear at reduced speed.

4. In a food mixer, a base having a supporting pedestal thereon, a casing, a handle on top of said casing, a plurality of downwardly extending beater shafts, an upwardly extending power shaft, and means including a motor within said casing having a diagonally upwardly extending motor shaft for operating said beater shafts at speeds below the speed of said motor and for operating said power shaft at a speed below that of said beater shafts said power shaft terminating within the confines of the casing and at approximately the level of the top of the handle.

5. In a food mixer, a base, a supporting standard on the base, a turntable rotatably mounted on the base at one side of the standard, a power unit detachably connected to said standard including an armature shaft of an electric motor which extends diagonally upward from the support to a point above the turntable when the power unit is disposed in operative position, and means for supporting a tool in a vertically depending position above the turntable including a transmission for driving a tool from the armature shaft.

6. In a food mixer having a base with means thereon for holding a bowl in a predetermined position, the combination of a supporting standard on the base at one side of said bowl means, a power unit carried at one end by the support in one of two positions and including an electric motor with the armature shaft thereof journalled on spaced bearings and extending diagonally upward at an angle of approximately 45° when the power unit is disposed in operative position, and means for supporting a tool in a vertically depending position above the bowl supporting means including a transmission located at the upper end of the armature shaft and having a drive shaft, said drive shaft being disposed diagonally to the major axis of the power unit with the lower end thereof exposed to receive the tool and drive relationship at a point on the side of the power unit between the bearings.

7. In a food mixer mechanism, a base having a horizontal supporting way thereon, a standard slidable mounting on said way, an elongated power unit including a motor and tool holders operated by said motor, means for holding said power unit in a plurality of positions at different angles on said standard including one in which the center of gravity of the motor is directly over said way, said means including non-rotative lug and socket engagement for rigidly supporting the power unit against movement with respect to the support except in a direction disengaging said lug and socket engagement.

8. In a food mixer mechanism having a mixing bowl, a base having a horizontal supporting way thereon, a standard slidably mounting on said way, a power unit housing removably mounted on said standard, means for holding said housing in a plurality of angular positions on and with respect to said standard, one of which is a raised inoperative position and another of which is a lowered operative position, a motor in said housing, a transmission including tool holders driven by the motor, said inoperative position disposing said tool holders at one side of the bowl above and at one side of the bowl, said slidable mounting further carrying the tool holders horizontally laterally with respect to the bowl when the housing is located in said inoperative position to provide maximum access to the bowl.

9. In a food mixer, a base, a turntable supported on the base, a supporting standard extending upwardly from the base at one side of said turntable, a power unit detachably connected at one end to said standard and extending upwardly and forwardly from said standard over said turntable, said power unit including a motor and a plurality of drive shafts operated by the motor extending downwardly from the upper portion of said power unit with the lower ends of said shafts located above the lower end of said power unit and adapted to operate interdigitating beaters.

10. In a food mixer, a base, turntable supported on the base, a supporting standard extending upwardly from the base, a power unit detachably connected at one end thereof to said standard and extending outwardly and upwardly from said standard over said turntable at an angle of 45°, a plurality of drive shafts operated by said motor and extending diagonally downwardly from the upper front end of said casing at an acute angle therewith and adapted to support in driving relationship interdigitating beaters.

11. A food mixer comprising a base, a support, an elongated power unit received upon said support, said power unit having an armature shaft therein extending diagonally upwardly at approximately 45° angle and journalled by a bearing at its upper end, a spiral pinion on the upper end of said shaft, a plurality of beater shafts extending vertically downwardly from the upper end of said power unit, a spiral gear on one of said beater shafts spaced horizontally at one side of and meshing with said spiral pinion for operating said beater shaft from said armature shaft, intermeshing gears carried by said beater shafts, a pinion on one of said beater shafts, a vertically disposed power shaft extending to the exterior of said housing directly above said bearing, and a gear on said power shaft engaging said last-named pinion for rotating said power shaft from said beater shaft.

12. In a food mixer, a base, a pedestal extending upwardly from said base, an ovate power unit having an armature shaft, means for detachably connecting one end of said unit to the upper end of said standard, the longitudinal axis of said armature shaft extending upwardly and over the base at one side of the pedestal, a pair of beater shafts extending perpendicular downward from the upper end of said armature shaft and at an acute angle with respect thereto, spiral gear members for driving one of said beater shafts from said armature, and gear members for driving the other beater shaft from said one beater shaft.

13. In a food mixer having a base and a support thereon, an elongated power unit housing mounted at one end upon the support and extending in a direction inclined upwardly from the support, an electric motor in said housing, a transmission driven by the motor disposed in the upper end of the housing and having a power take-off shaft opening approximately flush with the top of the housing when in operative position, a handle secured to the housing along the top side of the housing with the top thereof at approximately the level of said opening, and means for receiving a bowl at said opening in supported relation above and to overhang said handle in operative position.

14. In a food mixer, a base, a supporting pedestal member on said base, a power unit member, a plurality of downwardly extending beater shafts carried and driven by the power unit member, and means for securing the power unit member on the pedestal selectively in one of several positions including a lug carried by one of the members and engaging in a socket upon the other member, said lug and socket having mating contours which prevent relative rotation between the members.

15. In a food mixer a base, means adapted to receive bowls of different sized bottoms and tops, a supporting standard, an elongated power unit including a motor mounted at one end upon the standard and extending diagonally upward, and means for supporting a tool in a vertically depending position at the upper end of said power unit, said one end of the power unit being above the edge of the widest bowl receivable under said unit and below the top of the tallest bowl receivable on said base means under said unit when the power unit is disposed in operative position.

VERNE C. KENNEDY.

REFERENCES CITED

The following references are of record in the file of this patent:

UNITED STATES PATENTS

| Number | Name | Date |
|---|---|---|
| 2,024,383 | Newnham | Dec. 17, 1935 |
| 2,028,408 | Mross | Jan. 21, 1936 |
| 2,069,506 | Ross | Feb. 2, 1937 |
| 2,131,290 | Kochner et al. | Sept. 27, 1938 |
| 2,312,125 | Setterlund | Feb. 23, 1943 |
| 1,470,882 | Sauer | Oct. 16, 1923 |
| 2,086,817 | Newnham | July 13, 1937 |

FOREIGN PATENTS

| Number | Country | Date |
|---|---|---|
| 254,005 | Great Britain | 1924 |